(12) United States Patent
Lu et al.

(10) Patent No.: US 11,009,765 B1
(45) Date of Patent: May 18, 2021

(54) FOCUS ADJUSTING PANCHARATNAM BERRY PHASE LIQUID CRYSTAL LENSES IN A HEAD-MOUNTED DISPLAY

(71) Applicant: Facebook Technologies, LLC, Menlo Park, CA (US)

(72) Inventors: Lu Lu, Kirkland, WA (US); Scott Charles McEldowney, Redmond, WA (US); Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/451,492

(22) Filed: Jun. 25, 2019

Related U.S. Application Data

(63) Continuation of application No. 15/693,846, filed on Sep. 1, 2017, now Pat. No. 10,379,419.

(60) Provisional application No. 62/425,922, filed on Nov. 23, 2016.

(51) Int. Cl.
*G02F 1/29* (2006.01)
*G02B 27/28* (2006.01)
*G02B 30/25* (2020.01)

(52) U.S. Cl.
CPC ............. *G02F 1/29* (2013.01); *G02B 27/286* (2013.01); *G02B 30/25* (2020.01); *G02F 1/294* (2021.01)

(58) Field of Classification Search
CPC ... G02F 1/29; G02F 2001/294; G02B 27/286; G02B 27/26
See application file for complete search history.

(56) References Cited

U.S. PATENT DOCUMENTS

| 6,115,152 A | 9/2000 | Popovich et al. |
| 9,429,756 B1 | 8/2016 | Cakmakci et al. |
| 10,151,961 B2 | 12/2018 | Lu et al. |

(Continued)

FOREIGN PATENT DOCUMENTS

| CN | 105911697 A | 8/2016 |
| CN | 106654592 A | 5/2017 |

(Continued)

OTHER PUBLICATIONS

Banks, M.S. et al., "Consequences of Incorrect Focus Cues in Stereo Displays," Information Display Online, Jul. 2008, 7 pages, [Online] [Retrieved on Jun. 26, 2017] Retrieved from the internet: <URL:http://informationdisplay.org/IDArchive/2008/July/ConsequencesofIncorrectFocusCuesinStereoDis.aspx>.

(Continued)

*Primary Examiner* — Nathanael R Briggs
(74) *Attorney, Agent, or Firm* — Fenwick & West LLP

(57) ABSTRACT

A varifocal block includes, in optical series, a switchable half waveplate (SHWP) and a plurality of liquid crystal (LC) lenses. The SHWP outputs circularly polarized light, and a handedness of the circularly polarized light is controlled by the SHWP being in an active state or a non-active state. Each LC lens of the plurality of LC lenses has a plurality of optical states, the plurality of optical states including an additive state that adds optical power to the LC lens and a subtractive state that removes optical power from the LC lens. The plurality of optical states of each of the plurality of the LC lenses compounded in optical series provides a range of adjustment of optical power for the varifocal block.

20 Claims, 16 Drawing Sheets

(56) References Cited

U.S. PATENT DOCUMENTS

| | | |
|---|---|---|
| 10,690,930 B1 | 6/2020 | Lu et al. |
| 2002/0030776 A1 | 3/2002 | Khan et al. |
| 2002/0176148 A1 | 11/2002 | Onuki et al. |
| 2005/0047705 A1 | 3/2005 | Domash et al. |
| 2005/0151896 A1 | 7/2005 | Hara et al. |
| 2005/0254752 A1 | 11/2005 | Domash et al. |
| 2007/0097277 A1 | 5/2007 | Hong et al. |
| 2008/0018833 A1 | 1/2008 | Ma |
| 2009/0316097 A1 | 12/2009 | Presniakov et al. |
| 2010/0231783 A1* | 9/2010 | Bueler .............. G02B 3/0081 348/347 |
| 2012/0019523 A1 | 1/2012 | Lee et al. |
| 2012/0154924 A1 | 6/2012 | Lee et al. |
| 2013/0107177 A1 | 5/2013 | Kang |
| 2013/0176203 A1 | 7/2013 | Yun et al. |
| 2013/0307948 A1 | 11/2013 | Odake et al. |
| 2014/0022619 A1 | 1/2014 | Woodgate et al. |
| 2014/0192296 A1 | 7/2014 | Hsiao et al. |
| 2014/0204455 A1 | 7/2014 | Popovich et al. |
| 2014/0285878 A1 | 9/2014 | Escuti et al. |
| 2014/0300711 A1 | 10/2014 | Kroon et al. |
| 2014/0361990 A1 | 12/2014 | Leister |
| 2015/0010265 A1 | 1/2015 | Popovich et al. |
| 2015/0234187 A1 | 8/2015 | Lee |
| 2015/0323803 A1* | 11/2015 | Tung ................. G02B 30/27 359/465 |
| 2016/0011353 A1* | 1/2016 | Escuti ............... G02B 5/3083 359/15 |
| 2016/0103253 A1 | 4/2016 | Oku et al. |
| 2016/0327793 A1 | 11/2016 | Chen et al. |
| 2016/0349506 A1 | 12/2016 | Meneghini et al. |
| 2017/0293145 A1 | 10/2017 | Miller et al. |
| 2018/0132698 A1 | 5/2018 | Galstian et al. |

FOREIGN PATENT DOCUMENTS

| | | |
|---|---|---|
| WO | WO 2004/003596 A2 | 1/2004 |
| WO | WO 2008/026206 A2 | 3/2008 |
| WO | WO 2014/181419 A1 | 11/2014 |

OTHER PUBLICATIONS

Crawford, G.P., "Electrically Switchable Bragg Gratings," Optics & Photonics News, Apr. 2003, pp. 54-59, vol. 14, No. 4.

Hoffman, D.M. et al., "Vergence—Accomodation Conflicts Hinder Visual Performance and Cause Visual Fatigue," Journal of Vision, Mar. 2008, pp. 1-30, vol. 8, No. 33.

Nowinowski-Kruszelnicki, E. et al., "High Birefringence Liquid Crystal Mixtures for Electro-Optical Devices," Optica Applicata XLII, No. 1, 2012, pp. 167-180.

Shibata, T. et al., "The Zone of Comfort: Predicting Visual Discomfort with Stereo Displays," Journal of Vision, Jul. 2011, pp. 1-29, vol. 11 (8), No. 11.

United States Office Action, U.S. Appl. No. 15/930,071, dated Oct. 16, 2020, 23 pages.

* cited by examiner (Real World)

(3D Display)

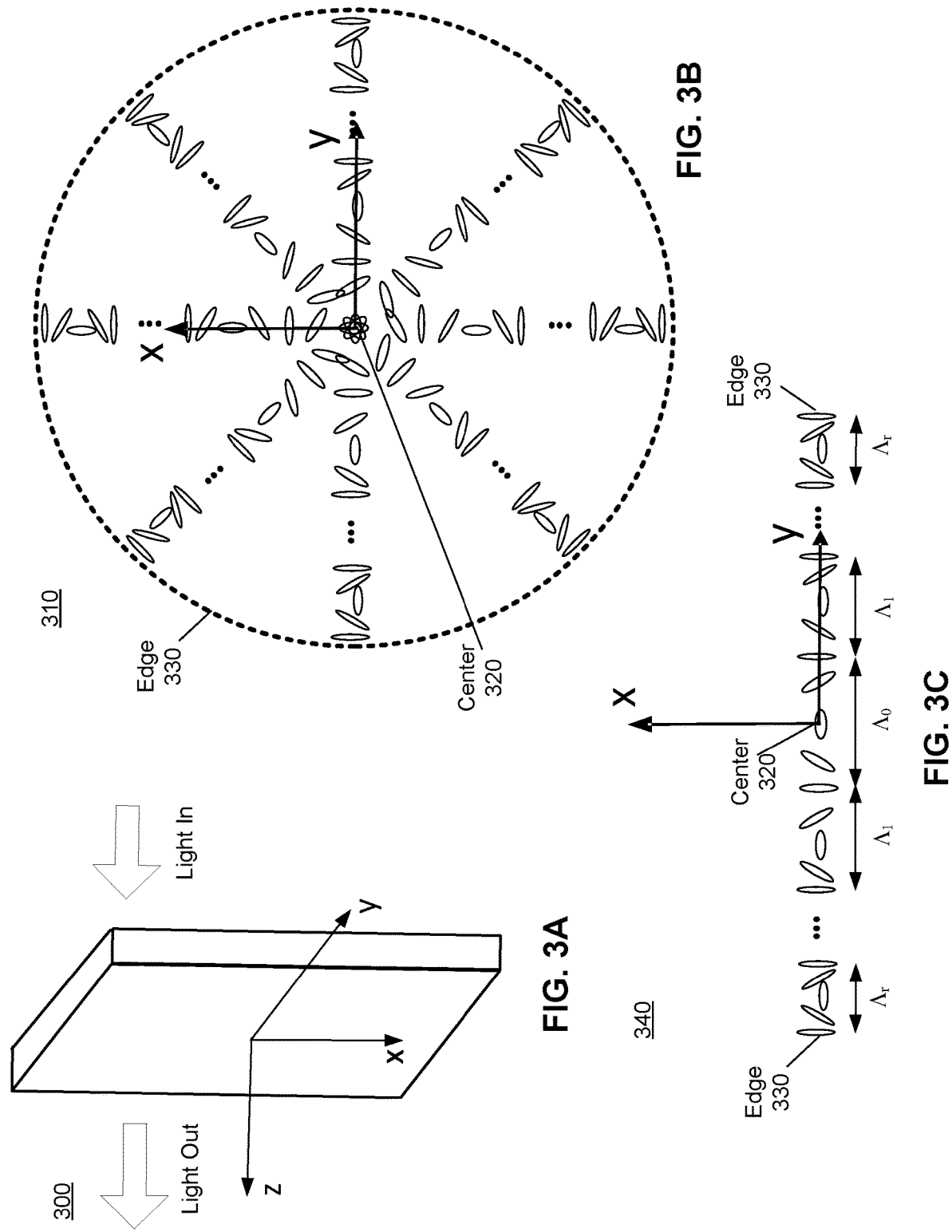

| SHWP 410 | non-active | non-active | Active | non-active | Active | non-active | active | non-active |
|---|---|---|---|---|---|---|---|---|
| Active Element 415 (+/- 0.5 D, 0) | 0 | 0.5 | -0.5 | 0 | 0 | 0.5 | -0.5 | 0 |
| Active Element 420 (+/- 1.5 D, 0) | 0 | 0 | 1.5 | 1.5 | -1.5 | -1.5 | 0 | 0 |
| Active Element 425 (+/- 3.5 D, 0) | 0 | 0 | 0 | 0 | 3.5 | 3.5 | 3.5 | 3.5 |
| Total PBP LC Lens Structure Optical Power (Diopter) | 0 | 0.5 | 1 | 1.5 | 2 | 2.5 | 3 | 3.5 |

FIG. 5B

| SHWP 410 | non-active | Active | non-active | Active | non-active | Active | non-active | Active |
|---|---|---|---|---|---|---|---|---|
| Active Element 415 (+/- 0.5 D, 0) | 0 | -0.5 | 0.5 | 0 | 0 | -0.5 | 0.5 | 0 |
| Active Element 420 (+/- 1.5 D, 0) | 0 | 0 | -1.5 | -1.5 | 1.5 | 1.5 | 0 | 0 |
| Active Element 425 (+/- 3.5 D, 0) | 0 | 0 | 0 | 0 | -3.5 | -3.5 | -3.5 | -3.5 |
| Total PBP LC Lens Structure Optical Power (Diopter) | 0 | -0.5 | -1 | -1.5 | -2 | -2.5 | -3 | -3.5 |

FIG. 5C

| | | | | | | | | |
|---|---|---|---|---|---|---|---|---|
| SHWP 610 | non-active | non-active | non-active | non-active | non-active | non-active | non-active | non-active |
| Active Element 630 (+/- 0.5D, 0) | 0 | 0.5 | 0 | 0.5 | 0 | 0.5 | 0 | 0.5 |
| SHWP 615 | non-active | non-active | non-active | non-active | non-active | non-active | non-active | Active |
| Active Element 635 (+/- 1D, 0) | 0 | 0 | 1 | 1 | 0 | 0 | 1 | 1 |
| SHWP 620 | non-active | non-active | non-active | non-active | Active | Active | Active | Active |
| Active Element 640 (+/- 2D, 0) | 0 | 0 | 0 | 0 | 2 | 2 | 2 | 2 |
| Total PBP LC Lens Structure Optical Power (Diopter) | 0 | 0.5 | 1 | 1.5 | 2 | 2.5 | 3 | 3.5 |

FIG. 6B

| | | | | | | | | |
|---|---|---|---|---|---|---|---|---|
| SHWP 610 | non-active | Active | non-active | Active | non-active | Active | non-active | Active |
| Active Element 630 (+/- 0.5D, 0) | 0 | -0.5 | 0 | -0.5 | 0 | -0.5 | 0 | -0.5 |
| SHWP 615 | non-active | non-active | Active | Active | non-active | non-active | Active | Active |
| Active Element 635 (+/- 1D, 0) | 0 | 0 | -1 | -1 | 0 | 0 | -1 | -1 |
| SHWP 620 | non-active | non-active | non-active | non-active | Active | Active | Active | Active |
| Active Element 640 (+/- 2D, 0) | 0 | 0 | 0 | 0 | -2 | -2 | -2 | -2 |
| Total PBP LC Lens Structure Optical Power (Diopter) | 0 | -0.5 | -1 | -1.5 | -2 | -2.5 | -3 | -3.5 |

| | | | | | | | | |
|---|---|---|---|---|---|---|---|---|
| SHWP 712 | Non-active | Non-active | Non-active | Non-active | Non-active | Non-active | Non-active | Non-active |
| Passive Element 728 (+/- 0.25D, 0) | 0.25 | 0.25 | 0.25 | 0.25 | 0.25 | 0.25 | 0.25 | 0.25 |
| SHWP 714 | Non-active | Active | Non-active | Non-active | Non-active | Active | Non-active | Active |
| Passive Element 730 (+/- 0.25D, 0) | -0.25 | 0.25 | -0.25 | 0.25 | -0.25 | 0.25 | -0.25 | 0.25 |
| SHWP 716 | Non-active | Non-active | Non-active | Active | Active | Non-active | Non-active | Active |
| Passive Element 732 (+/- 0.5D, 0) | 0.5 | -0.5 | 0.5 | 0.5 | 0.5 | -0.5 | 0.5 | 0.5 |
| SHWP 718 | Non-active | Non-active | Active | Active | Active | Non-active | Active | Active |
| Passive Element 734 (+/- 0.5D, 0) | -0.5 | 0.5 | 0.5 | 0.5 | -0.5 | -0.5 | 0.5 | 0.5 |
| SHWP 720 | Non-active | Non-active | Non-active | Non-active | Non-active | Non-active | Active | Active |
| Passive Element 736 (+/- 1D, 0) | 1 | -1 | -1 | -1 | 1 | 1 | 1 | 1 |
| SHWP 722 | Non-active | Non-active | Non-active | Non-active | Active | Active | Active | Active |
| Passive Element 738 (+/- 1D, 0) | -1 | 1 | 1 | 1 | 1 | 1 | 1 | 1 |
| Total PBP LC Lens Structure Optical Power (Diopter) | 0 | 0.5 | 1 | 1.5 | 2 | 2.5 | 3 | 3.5 |

FIG. 7B

| | | | | | | | | | |
|---|---|---|---|---|---|---|---|---|---|
| SHWP 712 | Non-active | Active | Non-active | Active | Non-active | Active | Non-active | Active | Non-active |
| Passive Element 728 (+/- 0.25D, 0) | 0.25 | -0.25 | 0.25 | -0.25 | 0.25 | -0.25 | 0.25 | -0.25 | -0.25 |
| SHWP 714 | Non-active | Active | Non-active | Active | Non-active | Active | Non-active | Active | Non-active |
| Passive Element 730 (+/- 0.25D, 0) | -0.25 | -0.25 | -0.25 | -0.25 | -0.25 | -0.25 | 0.25 | -0.25 | Active |
| SHWP 716 | Non-active | Non-active | Active | Active | Non-active | Non-active | Non-active | Non-active | Active |
| Passive Element 732 (+/- 0.5D, 0) | 0.5 | 0.5 | -0.5 | -0.5 | 0.5 | 0.5 | 0.5 | -0.5 | -0.5 |
| SHWP 718 | Non-active | Non-active | Active | Active | Non-active | Non-active | Active | Active | Active |
| Passive Element 734 (+/- 0.5D, 0) | -0.5 | -0.5 | -0.5 | -0.5 | -0.5 | -0.5 | -0.5 | -0.5 | -0.5 |
| SHWP 720 | Non-active | Non-active | Non-active | Non-active | Active | Active | Active | Active | Active |
| Passive Element 736 (+/- 1D, 0) | 1 | 1 | 1 | 1 | -1 | -1 | -1 | -1 | -1 |
| SHWP 722 | Non-active | Non-active | Non-active | Non-active | Active | Active | Active | Active | Active |
| Passive PBP Element 738 (+/- 1D, 0) | -1 | -1 | -1 | -1 | -1 | -1 | -1 | -1 | -1 |
| Total PBP LC Lens Structure Optical Power (Diopter) | 0 | -0.5 | -1 | -1.5 | -2 | -2.5 | -3 | -3.5 | |

FIG. 7C

FOCUS ADJUSTING PANCHARATNAM BERRY PHASE LIQUID CRYSTAL LENSES IN A HEAD-MOUNTED DISPLAY

CROSS REFERENCE TO RELATED APPLICATIONS

This application is a continuation of co-pending U.S. application Ser. No. 15/693,846, filed Sep. 1, 2017, claims the benefit of U.S. Provisional Application No. 62/425,922, filed Nov. 23, 2016, all of which are incorporated by reference in their entirety.

BACKGROUND

The present disclosure generally relates to adaptive visual images from electronic displays, and specifically to varying the focal length of optics to enhance comfortable viewing experience in head mounted displays.

Virtual reality (VR) headset can be used to simulate virtual environments. For example, stereoscopic images can be displayed on an electronic display inside the headset to simulate the illusion of depth and head tracking sensors can be used to estimate what portion of the virtual environment is being viewed by the user. Such a simulation, however, can cause visual fatigue and nausea resulting from an inability of existing headsets to correctly render or otherwise compensate for vergence and accommodation conflicts. Augmented Reality (AR) headsets display a virtual image overlapping with the real world. To create comfortable viewing experience, the virtual image generated by the AR headsets needs to be displayed at the right distance for the eye accommodations of the real world objects at different time.

SUMMARY

A varifocal block has a range of adjustment of optical power. The varifocal block includes a switchable half waveplate (SHWP) and a plurality of liquid crystal (LC) lenses. The SWHP and the plurality of LC lenses are in optical series with each other. The SHWP outputs circularly polarized light, and a handedness of the circularly polarized light is controlled by the SHWP being in an active state or a non-active state. And each LC lens of the plurality of LC lenses has a plurality of optical states. The plurality of optical states include an additive state that adds optical power to a LC lens and a subtractive state that removes optical power from the LC lens. The plurality of optical states of each of the plurality of the LC lenses compounded in optical series provides a range of adjustment of optical power for the varifocal block.

The varifocal block may be part of a head-mounted display (HMD). The HMD presents content via an electronic display to a wearing user at a focal distance. The varifocal block presents the content over a plurality of image planes that are associated with different optical powers of the varifocal block. As noted above, the varifocal block has a range of adjustment of optical power. Each value of optical power over the range of adjustment of optical power corresponds to a different image plane of the plurality of image planes. In some embodiments, the varifocal block adjusts the image plane location in accordance with instructions from the HMD to, e.g., mitigate vergence accommodation conflict of eyes of the wearing user. The image plane location is adjusted by adjusting an optical power associated with the varifocal block, and specifically by adjusting the optical powers associated with one or more of the LC lenses in the plurality of LC lenses, and a state of at least one SHWP.

BRIEF DESCRIPTION OF THE DRAWINGS

FIG. 3A is an example Pancharatnam Berry Phase liquid crystal lens, according to an embodiment.

FIG. 3B is an example of liquid crystal orientations in the Pancharatnam Berry Phase liquid crystal lens of FIG. 3A, according to an embodiment.

FIG. 3C is a portion of liquid crystal orientations in the Pancharatnam Berry Phase liquid crystal lens of FIG. 3A, according to an embodiment.

FIG. 5B is a table showing example optical power adjustments in the positive range of the stacked active Pancharatnam Berry Phase liquid crystal lens structure shown in FIG. 5A, according to an embodiment.

FIG. 5C is a table showing example optical power adjustments in the negative range of the stacked active Pancharatnam Berry Phase liquid crystal lens structure shown in FIG. 5A, according to an embodiment.

FIG. 6B is a table showing example optical power adjustments in the positive range of the stacked active Pancharatnam Berry Phase liquid crystal lens structure shown in FIG. 6A, according to an embodiment.

FIG. 6C is a table showing example optical power adjustments in the negative range of the stacked active Pancharatnam Berry Phase liquid crystal lens structure shown in FIG. 6A, according to an embodiment.

FIG. 7B is a table showing example optical power adjustments in the positive range of the stacked passive Pancharatnam Berry Phase liquid crystal lens structure shown in FIG. 7A, according to an embodiment.

FIG. 7C is a table showing example optical power adjustments in the negative range of the stacked passive Pancharatnam Berry Phase liquid crystal lens structure shown in FIG. 7A, according to an embodiment.

Figure 1A:
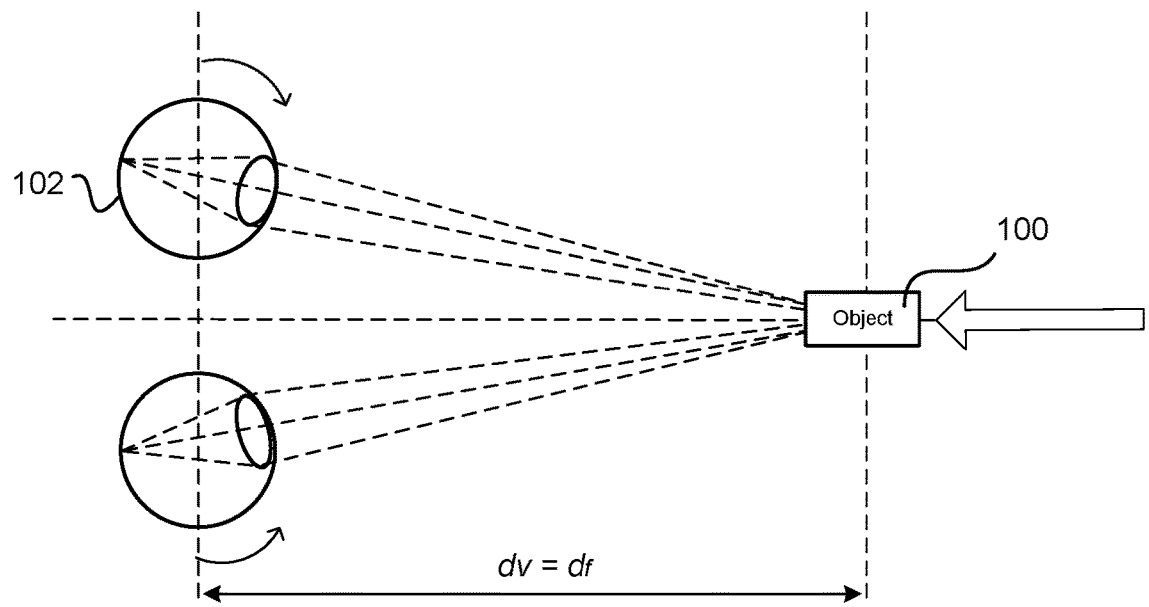
FIG. 1A shows the relationship between vergence and eye focal length in the real world.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

A multifocal system includes a head-mounted display (HMD). The HMD includes one or more multifocal blocks that adjust a focal distance at which images are presented to a user of the HMD. A multifocal block includes a plurality of Pancharatnam Berry Phase (PBP) liquid crystal lenses in optical series. The HMD presents content via an electronic display to a wearing user at a focal distance. The multifocal adjusts the focal distance in accordance with instructions from the HMD to, e.g., mitigate vergence accommodation conflict of eyes of the wearing user. The focal distance is adjusted by adjusting an optical power associated with the multifocal block, and specifically by adjusting the respective optical powers associated with one or more of the PBP liquid crystal lenses within the multifocal. Optical series refers to relative positioning of a plurality of optical elements such that light, for each optical element of the plurality of optical elements, is transmitted by that optical element before being transmitted by another optical element of the plurality of optical elements. Moreover, ordering of the optical elements does not matter. For example, optical element A placed before optical element B, or optical element B placed before optical element A, are both in optical series. Similar to electric circuitry design, optical series represents optical elements with their optical properties compounded when placed in series.

The multifocal block includes one or more stacked PBP liquid crystal structures. Multiple PBP liquid crystal lenses and at least one half waveplate are coupled together in optical series to form a stacked PBP liquid crystal structure that has a tunable range of optical power. As each PBP liquid crystal lens provides a particular amount of optical power, the tunable range of optical power is determined in part by a number of PBP liquid crystal lenses in each stacked PBP liquid crystal structure and how much optical power a particular PBP liquid crystal lens can provide. PBP liquid crystal lenses may also be active (also referred to as an active element) or passive (also referred to as a passive element). An active PBP liquid crystal lens has three optical states. The three optical states are an additive state, a neutral state, and a subtractive state. The additive state adds optical power to the system (i.e., has a positive focus of 'f'), the neutral state does not affect the optical power of the system (and does not affect the polarization of light passing through the active PBP liquid crystal lens), and the subtractive state subtracts optical power from the system (i.e., has a negative focus of '−f'). The state of an active PBP liquid crystal lens is determined by the by the handedness of polarization of light incident on the active PBP liquid crystal lens and an applied voltage. An active PBP liquid crystal lens operates in a subtractive state responsive to incident light with a right handed circular polarization and an applied voltage of zero (or more generally below some minimal value), operates in an additive state responsive to incident light with a left handed circular polarization and the applied voltage of zero (or more generally below some minimal value), and operates in a neutral state (regardless of polarization) responsive to an applied voltage larger than a threshold voltage which aligns liquid crystal with positive dielectric anisotropy along with the electric field direction. Note that if the active PBP liquid crystal lens is in the additive or subtractive state, light output from the active PBP liquid crystal lens has a handedness opposite that of the light input into the active PBP liquid crystal lens. In contrast, if the active PBP liquid crystal lens is in the neutral state, light output from the active PBP liquid crystal lens has the same handedness as the light input into the active PBP liquid crystal lens.

A switchable half wave plate (SHWP) is used to switch the handedness of the polarization of light incident on an PBP liquid crystal lens. Therefore, one gets the freedom of selecting a positive focus or a negative focus of the PBP LC lens by using the EHWP.

In contrast, a passive PBP liquid crystal lens has two optical states, specifically, an additive state and a subtractive state. And the state of a passive PBP liquid crystal lens is determined by the handedness of polarization of light incident on the passive PBP liquid crystal lens. A passive PBP liquid crystal lens operates in a subtractive state responsive to incident light with a right handed polarization and operates in an additive state responsive to incident light with a left handed polarization. Note that the passive PBP liquid crystal lens outputs light that has a handedness opposite that of the light input into the passive PBP liquid crystal lens.

Combinations of PBP liquid crystal lenses may be stacked together to generate a multifocal block within a HMD. Some, or all, of the stacked PBP liquid crystal lenses may adjust the optical power of the multifocal block by different amounts (e.g., a first PBP liquid crystal lens may cause a ±0.25 diopter change in optical power, and a second PBP liquid crystal lens may cause a ±0.75 diopter change in optical power). Each stack of the multifocal system includes at least one switchable half waveplate (SHWP). The multifocal block uses the SHWP to control the handedness of polarization of light in accordance with a switching state. The switching state of a SHWP is either active or non-active. When active, the SHWP reverses the handedness of polarized light, and when non-active, the SHWP transmits polarized light without affecting the handedness. Accordingly, using a plurality of stacked PBP lenses and at least one SHWP allows the multifocal system to generate a tunable range of focal distances.

In some embodiments, a virtual object is presented on the electronic display of the HMD that is part of the multifocal system. The light emitted by the HMD is configured to have a particular focal distance, such that the virtual scene appears to a user at a particular focal plane. As the content to be rendered moves closer/farther from the user, the HMD correspondingly instructs the multifocal block to adjust the focal distance to mitigate a possibility of a user experiencing a conflict with eye vergence and eye accommodation. Additionally, in some embodiments, the HMD may track a user's eyes such that the multifocal system is able to approximate gaze lines and determine a gaze point including a vergence depth (an estimated point of intersection of the gaze lines) to determine an appropriate amount of accommodation to provide the user. The gaze point identifies an object or plane of focus for a particular frame of the virtual scene and the HMD adjusts the distance of the multifocal block to keep the user's eyes in a zone of comfort as vergence and accommodation change.

Vergence-Accommodation Overview

Vergence-accommodation conflict is a problem in many virtual reality systems. Vergence is the simultaneous movement or rotation of both eyes in opposite directions to obtain or maintain single binocular vision and is connected to accommodation of the eye. Under normal conditions, when human eyes look at a new object at a distance different from an object they had been looking at, the eyes automatically change focus (by changing their shape) to provide accommodation at the new distance or vergence depth of the new object. FIG. 1A shows an example of how the human eye experiences vergence and accommodation in the real world. In the example of FIG. 1A, the user is looking at a real object 100 (i.e., the user's eyes are verged on the real object 100 and gaze lines from the user's eyes intersect at real object 100.). As the real object 100 is moved closer to the user, as indicated by the arrow in FIG. 1A, each eye 102 rotates inward (i.e., convergence) to stay verged on the real object 100A. As the real object 100 gets closer, the eye 102 must "accommodate" for the closer distance by changing its shape to reduce the power or focal length. Thus, under normal conditions in the real world, the vergence depth ($d_v$) equals the focal length ($d_f$).

Figure 1B:
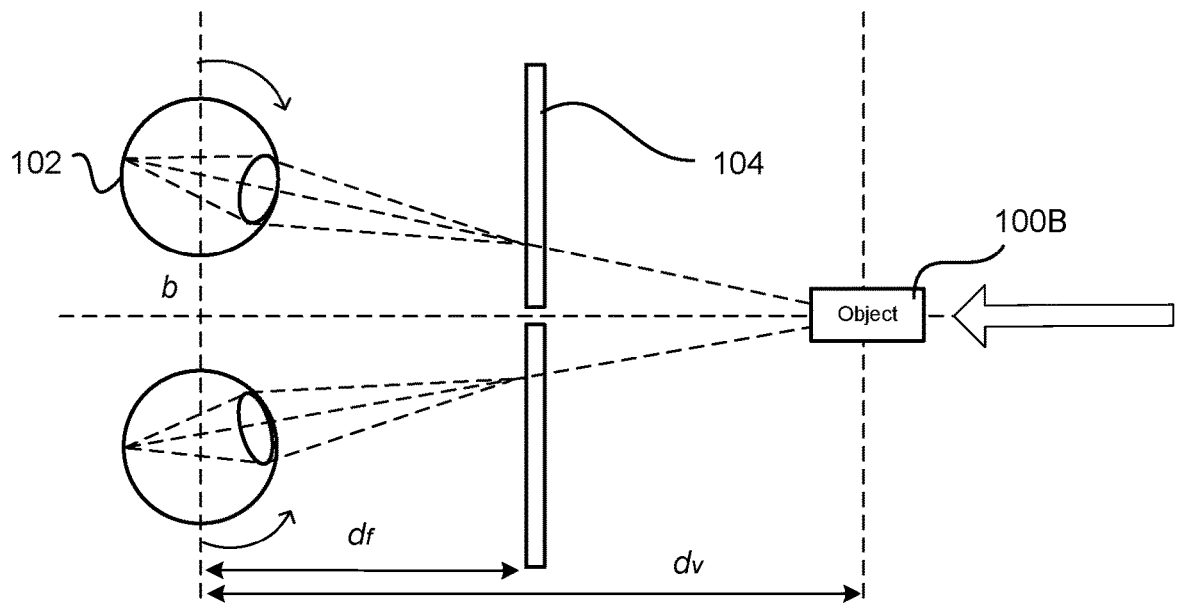
FIG. 1B shows the conflict between vergence and eye focal length in a three-dimensional display screen.

FIG. 1B shows an example conflict between vergence and accommodation that can occur with some three-dimensional displays. In this example, a user is looking at a virtual object 100B displayed on an electronic screen 104; however, the user's eyes are verged on and gaze lines from the user's eyes intersect at virtual object 100B, which is a greater distance from the user's eyes than the electronic screen 104. As the virtual object 100B is rendered on the electronic display 104 to appear closer to the user, each eye 102 again rotates inward to stay verged on the virtual object 100B, but the power or focal length of each eye is not reduced; hence, the user's eyes do not accommodate as in FIG. 1A. Thus, instead of reducing power or focal length to accommodate for the closer vergence depth, each eye 102 maintains accommodation at a distance associated with the electronic display 104. Thus, the vergence depth ($d_v$) often does not equal the focal length ($d_f$) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable for virtual reality system creators.

Head-Mounted Display Overview

Figure 2A:
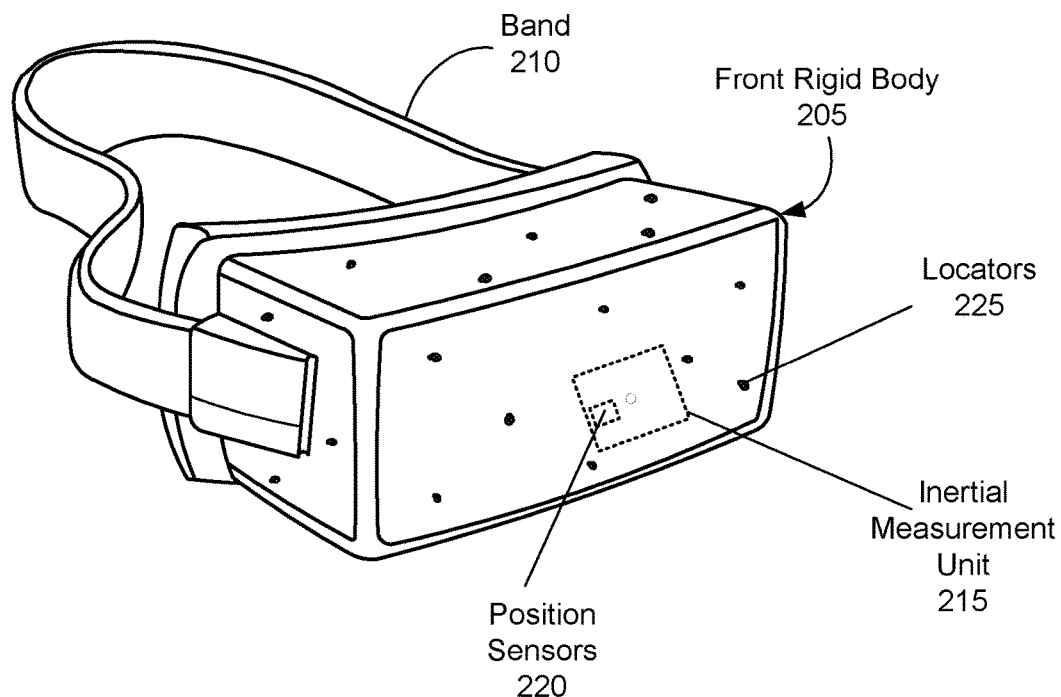
FIG. 2A is a wire diagram of a head-mounted display, in accordance with an embodiment.

FIG. 2A is a wire diagram of a HMD 200, in accordance with an embodiment. The HMD 200 includes a front rigid body 205 and a band 210. The front rigid body 205 includes one or more electronic display elements of an electronic display (not shown), an IMU 215, the one or more position sensors 220, and the locators 225. In the embodiment shown by FIG. 2A, the position sensors 220 are located within the IMU 215, and neither the IMU 215 nor the position sensors 220 are visible to the user. The IMU 215, the position sensors 220, and the locators 225 are discussed in detail below with regard to FIG. 7. Note in embodiments, where the HMD 200 acts as an AR or MR device portions of the HMD 200 and its internal components are at least partially transparent.

Figure 2B:
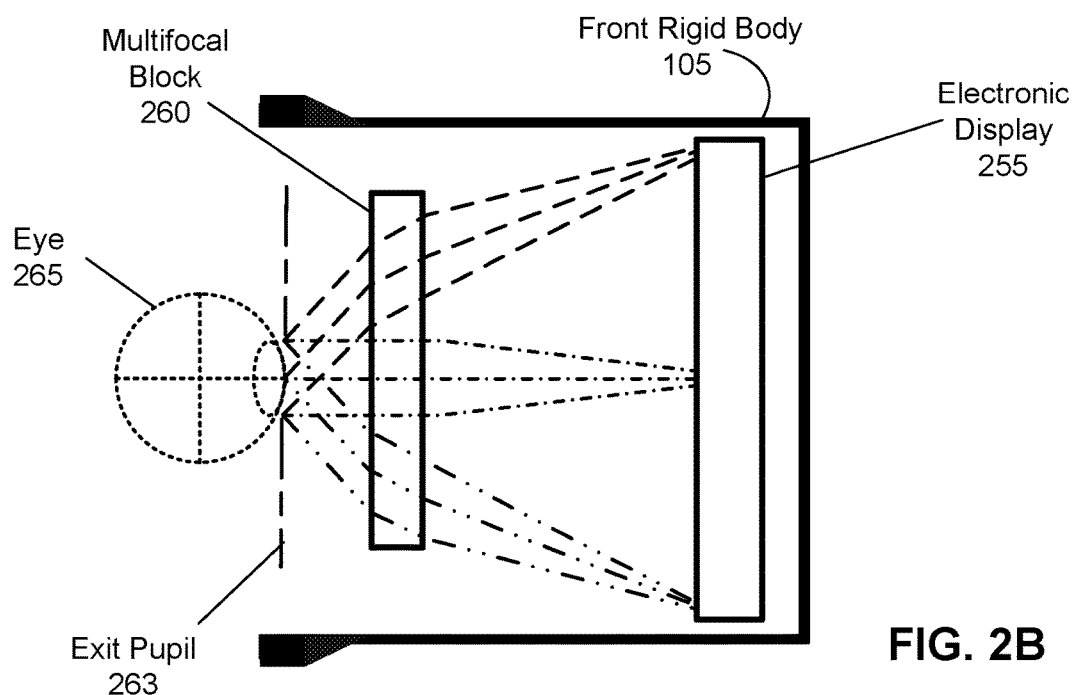
FIG. 2B is a cross section of a front rigid body of the head-mounted display in FIG. 2A, in accordance with an embodiment.

FIG. 2B is a cross section 250 of the front rigid body 205 of the embodiment of the HMD 200 shown in FIG. 2A. As shown in FIG. 2B, the front rigid body 205 includes an electronic display 255 and a multifocal block 260 that together provide image light to an exit pupil 263. The exit pupil 263 is the location of the front rigid body 205 where a user's eye 265 is positioned. For purposes of illustration, FIG. 2B shows a cross section 250 associated with a single eye 265, but another multifocal block 260, separate from the multifocal block 260, provides altered image light to another eye of the user. Additionally, the HMD 200 includes an eye tracking system (not shown). The eye tracking system may include, e.g., one or more sources that illuminate one or both eyes of the user, and one or more cameras that captures images of one or both eyes of the user.

The electronic display 255 displays images to the user. In various embodiments, the electronic display 255 may comprise a single electronic display or multiple electronic displays (e.g., a display for each eye of a user). Examples of the electronic display 255 include: a liquid crystal display (LCD), an organic light emitting diode (OLED) display, an active-matrix organic light-emitting diode display (AMOLED), a QOLED, a QLED, some other display, or some combination thereof.

The multifocal block 260 adjusts an orientation from light emitted from the electronic display 255 such that it appears at particular focal distances from the user. The multifocal block 260 includes one or more stacked PBP liquid crystal lens structures in optical series, where each stacked PBP liquid crystal lens structures includes a plurality of PBP liquid crystal lenses and at least one SHWP. Details of liquid crystal lenses are discussed in detail below with regard to FIGS. 3A-3C. A SHWP is a half waveplate that reverses a handedness of polarized light in accordance with a switching state (i.e., active or non-active). Different embodiments, of stacked PBP liquid crystal lens structures are discussed in detail below with regard to FIGS. 4-7B.

A plurality of PBP liquid crystal lens and at least one SHWP within the multifocal block 260 are stacked in optical series to create a stacked PBP liquid crystal lens structure. A stacked LC structure includes a plurality of PBP liquid crystal lens that are coupled together in a manner that the overall optical power of the stacked LC structure is tunable over a range of optical powers. The PBP liquid crystal lenses in a stacked PBP liquid crystal lens structure may be active, passive, or some combination thereof. Tuning to a particular optical power is accomplished by controlling the handedness of polarized light as it moves through the stacked PBP liquid crystal lens structure, applied voltage (e.g., in the context of active PBP liquid crystal lenses), and controlling a switching state of one or more SHWPs. In some embodiments, each PBP liquid crystal lens within a stacked PBP liquid crystal lens structure is the same. In other embodiments, one or more of the PBP liquid crystal lenses within a stacked PBP liquid crystal lens structure is different than another PBO liquid crystal lens within the stacked PBP liquid crystal lens structure. For example, one PBP liquid crystal lens provided ±0.25 diopters of optical power while another LC lens provides ±1.0 diopters of optical power.

Moreover, as the individual LC lenses each contribute a relatively low amount of optical power to the multifocal block 260, each of them may have a fast switching time. Accordingly, a stacked PBP liquid crystal lens structure may be designed to have a relatively high optical power (e.g., 2 or more diopters) while having a fast switching speed (e.g., ~300 ms). Accordingly, a stacked PBP liquid crystal structure may be used to provide increased optical power to the multifocal block 260.

Additionally, in some embodiments, the multifocal block 260 magnifies received light, corrects optical errors associated with the image light, and presents the corrected image light is presented to a user of the HMD 200. The multifocal block 260 may additionally include one or more optical elements in optical series. An optical element may be an aperture, a Fresnel lens, a convex lens, a concave lens, a filter, or any other suitable optical element that affects the blurred image light. Moreover, the multifocal block 260 may include combinations of different optical elements. In some embodiments, one or more of the optical elements in the multifocal block 260 may have one or more coatings, such as anti-reflective coatings.

FIG. 3A is an example PBP liquid crystal lens 300, according to an embodiment. The PBP liquid crystal lens 300 creates a respective lens profile via an in-plane orientation ($\Theta$, azimuth angle) of a liquid crystal molecule, in which the phase difference $T=2\Theta$. In contrast, a conventional liquid crystal lens creates a lens profile via a birefringence ($\Delta n$) and layer thickness (d) of liquid crystals, and a number (#) of Fresnel zones (if it is Fresnel lens design), in which the phase difference $T=\Delta nd*\#*2\pi/\lambda$. Accordingly, in some embodiments, a PBP liquid crystal lens 300 may have a large aperture size and can be made with a very thin liquid crystal layer, which allows fast switching speed to turn the lens power on/off.

Design specifications for HMDs used for VR, AR, or MR applications typically requires a large range of optical power to adapt for human eye vergence-accommodation (e.g., ~±2 Diopters or more), fast switching speeds (e.g., ~300 ms), and a good quality image. Note conventional liquid crystal lenses are not well suited to these applications as, a conventional liquid crystal lens generally would require the liquid crystal to have a relatively high index of refraction or be relatively thick (which reduces switching speeds). In contrast, a PBP liquid crystal lens is able to meet design specs using a liquid crystal having a relatively low index of refraction, is thin (e.g., a single liquid crystal layer can be ~2 μm), and has high switching speeds (e.g., 300 ms).

FIG. 3B is an example of liquid crystal orientations 310 in the PBP liquid crystal lens 300 of FIG. 3A, according to an embodiment. In the PBP liquid crystal lens 300, an azimuth angle ($\Theta$) of a liquid crystal molecule is continuously changed from a center 320 of the liquid crystal lens 300 to an edge 330 of the PBP liquid crystal lens 300, with a varied pitch $\Lambda$. Pitch is defined in a way that the azimuth angle of LC is rotated 180° from the initial state.

FIG. 3C is a section of liquid crystal orientations 340 taken along a y axis in the PBP liquid crystal lens 300 of FIG. 3A, according to an embodiment. It is apparent from the liquid crystal orientation 340 that a rate of pitch variation is a function of distance from the lens center 320. The rate of pitch variation increases with distance from the lens center. For example, pitch at the lens center ($\Lambda_0$), is the slowest and pitch at the edge 320 ($\Lambda_r$) is the highest, i.e., $\Lambda_0 > \Lambda_1 > \ldots > \Lambda_r$. In the x-y plane, to make a PBP liquid crystal lens with lens radius (r) and lens power (+/−f), the azimuth angle needs to meet: $2\Theta = r^2/f*(\pi/\lambda)$, where $\lambda$ is the wavelength of light. Along with the z-axis, a dual twist or multiple twisted structure layers offers achromatic performance on efficiency in the PBP liquid crystal lens 300. Along with the z-axis, the non-twisted structure is simpler to fabricate then a twisted structure, but is optimized for a monochromatic light.

Note that a PBP liquid crystal lens may have a twisted or non-twisted structure. In some embodiments, a stacked PBP liquid crystal lens structure may include one or more PBP liquid crystal lenses having a twisted structure, one or more PBP liquid crystal lenses having a non-twisted structure, or some combination thereof.

Example Stacked PBP Liquid Crystal Lens Structures

Below various designs of stacked PBP liquid crystal lens structures are discussed. It is important to note that these designs are merely illustrative, and other designs of stacked structures may be generated using the principles described herein. For example, the examples below discuss different designs that each provide 16 different focal planes that are separated by 0.25 diopters of optical power with a total optical power adjustment ranging from 0 diopters to 3.75 diopters. Using the principles described herein, one skilled in the art may create other designs for stacked PBP liquid crystal lens structures having different ranges of optical power (0 to 10 diopters, −2 to 2 diopters, etc.), different numbers of focal planes (5, 10, 12, etc.), different separation between focal planes (0.1 diopters, 0.3 diopters, etc.). In other embodiments the stacked PBP LC lens structures can include other optical elements in optical series.

Figure 4:
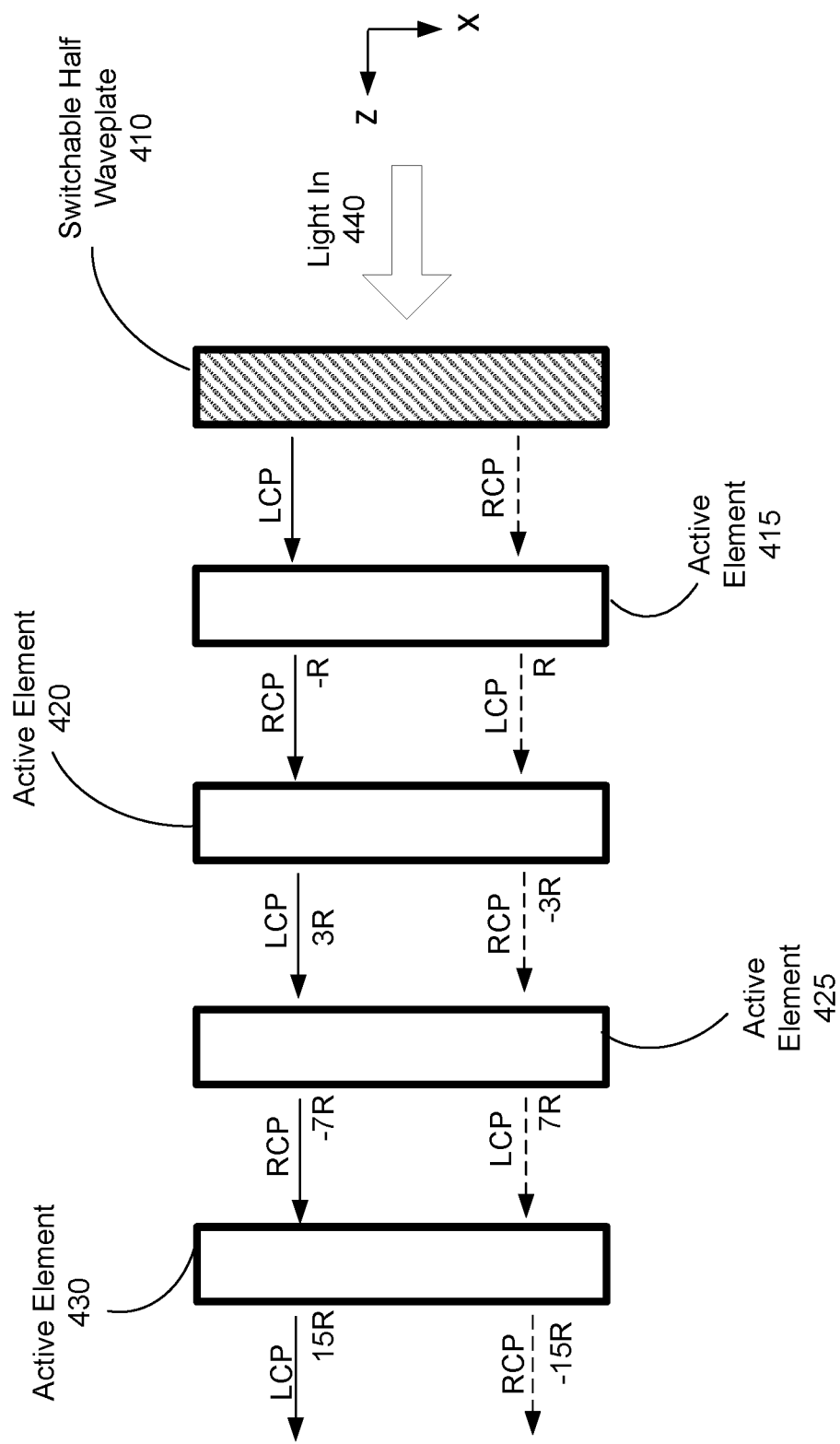
FIG. 4 is a generic design of a stacked PBP liquid crystal lens structure that includes a plurality of active PBP liquid crystal lens, according to an embodiment.

FIG. 4 is a generic design of a stacked PBP liquid crystal lens structure 400 that includes a plurality of active PBP liquid crystal lens in optical series, according to an embodiment. The stacked PBP liquid crystal lens structure 400 includes a SHWP 410 and active elements 415, 420, 425, and 430. An active element is an active PBP liquid crystal lens. In additive states, the active elements 415, 420, 425, and 430 add R, 3R, 7R, and 15R, respectively, of optical power, where R (step resolution) is any positive number (e.g., 0.1, 0.25, 0.5 etc.). Conversely, in a subtractive state, the active elements 415, 420, 425, and 430 subtract −R, −3R, −7R, and −15R, respectively, of optical power. This general design provides a PBP liquid crystal lens structure with a range of optical power adjustment of −15R to 15R, in increments of R. And in general, when a number of active PBP lenses is N (positive integer), the total number of tuning steps in $2^N-1$. For example, in FIG. 4, there are four active elements, so there are 15 tuning step that range from −15R to 15R, in increments of −R.

In FIG. 4, the light in 440 may be left handed circularly polarized (LCP) light or right handed circularly polarized (RCP) light. The state of the SHWP 410 determines the handedness of the light output from the SHWP 410. For example, if the light in 440 is right handed circularly polarized light and the SHWP 510 is active, the SHWP 510 reverse the polarization to left handed. Note when not in a neutral state—an active element reverses the handedness of circularly polarized light in addition to focusing/defocusing the light. Hence, LCP light entering the active element 410 is output as RCP light with a reduction of optical power of −R.

Note, that while FIG. 4 shows 4 active Pancharatnam berry phase LC lens with 1 active switchable halfwave plate, it may be expanded to more or less active elements. For example, in some embodiments, a stacked PBP liquid crystal lens structure may include just three active elements (e.g., the active elements 415, 420, and 425) and the SHWP 410. In this embodiment, when R=0.5, N=3, the image focus plane can be tuned from −3.5 Diopter to 3.5 Diopter, with a step resolution 0.5 diopter. Another embodiment of a stacked PBP liquid crystal lens structure may include just two active elements (e.g., the active elements 415 and 420) and the SHWP 410. In this embodiment, when R=0.6, N=2, the image focus plane can be tuned from −1.8 Diopter to 1.8 Diopter, with a step resolution 0.6 diopter.

Figure 5A:
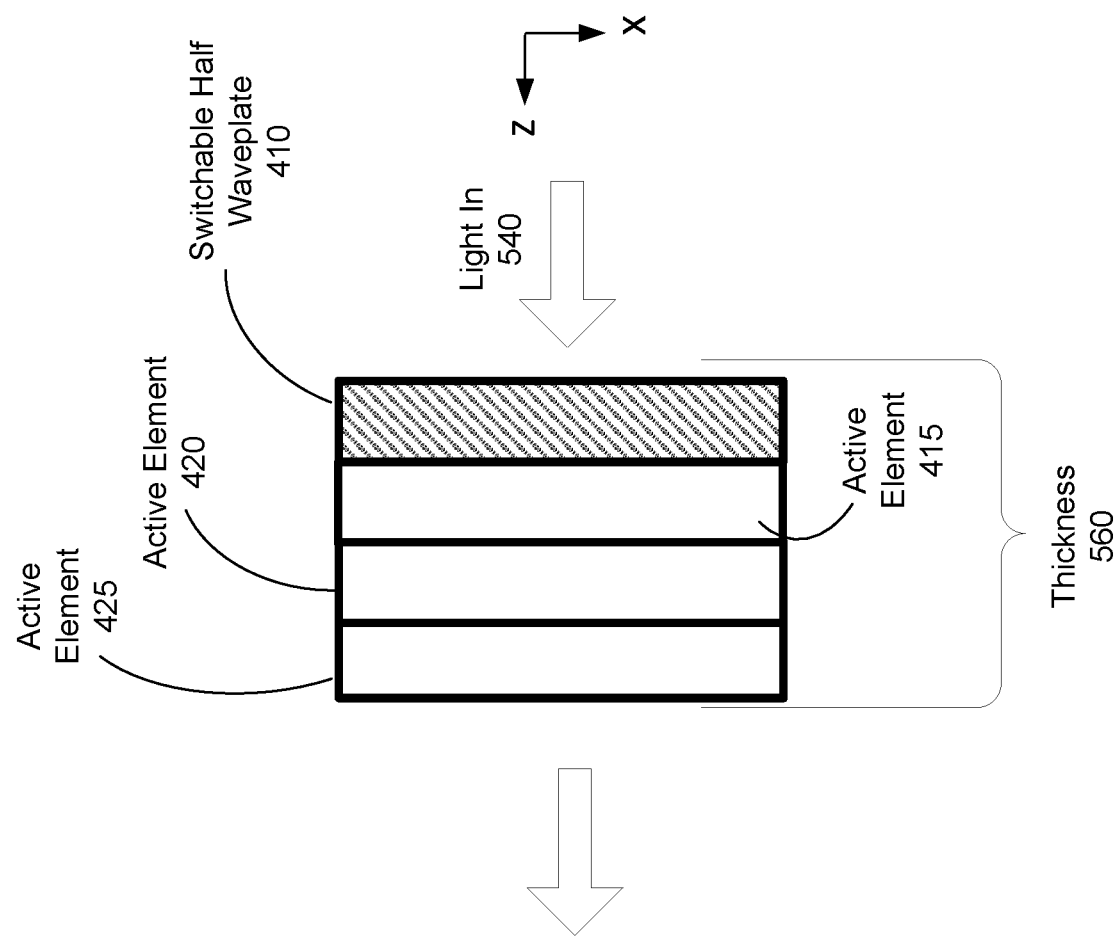
FIG. 5A is a diagram of a stacked Pancharatnam Berry Phase liquid crystal lens structure that includes a plurality of active Pancharatnam Berry Phase liquid crystal lens, according to an embodiment.

Turning now to a discussion of a design that is developed using a modification of the generic design of FIG. 4, FIG. 5A is a diagram of a stacked PBP liquid crystal lens structure 500 that includes a plurality of active PBP liquid crystal lens in optical series, according to an embodiment. The stacked PBP liquid crystal lens structure 500 includes a SHWP 410 and active elements 415, 420, and 425. This particular stacked PBP liquid crystal lens structure 400 provides multiple focus planes over a ±3.55 Diopters with a 0.5 Diopter resolution. The stacked PBP liquid crystal lens structure 500 is relatively thin as it includes 4 optical elements. A thickness 560 of the stacked PBP liquid crystal lens structure 500 may be, e.g., approximately 600-1200 μm.

Note that this embodiment is based on light in 540 being right handed circularly polarized light. In alternate embodiments, the light in 540 may be left handed circularly polarized light. In this case, the stacked PBP liquid crystal lens structure 500 would operate in substantially the same way, except that the active state of the SHWP 510 would be reversed.

FIG. 5B is a table 570 showing example optical power adjustments of the stacked PBP liquid crystal lens structure 500 shown in FIG. 5A, according to an embodiment. The table 570 illustrates how different optical powers are achieved from 0 to 3.5 diopters. Note one skilled in the art, using the principles described herein could easily extend this table to show how different optical powers are achieved from −3.5 diopters to 0 (as shown in FIG. 5C). Recall, that active PBP liquid crystal lenses have three states, an additive state, a subtractive state, and a neutral state. The active lens element 415 has an additive state (+0.5 D), a subtractive state (−0.5 D), and a neutral state (0). The active lens element 420 has an additive state (+1.5 D), a subtractive state (−1.5 D), and a neutral state (0). The active lens element 425 has an additive state (+3.5 D), a subtractive state (−3.5 D), and a neutral state (0). In alternate embodiments, one or more of the active elements 415-425 may be associated with different additive/subtractive states.

A bottom row 580 of the table 570 illustrates the different amounts of optical power that that the stacked PBP liquid crystal lens structure 500 is able to provide. The multifocal system controls settings of the SHWP 410 and the active elements 415-425 to select a particular mount of optical power to add to the system. In this embodiment, there are 16 different selections that range from 0 diopters to 3.5 diopters in increments of 0.5 diopters. Note, omitted from this table (for simplicity) are 7 additional selections that range from −3.5 diopters to −0.5 diopters, this is instead shown in FIG. 5C.

For example, to get 2 diopters of optical power, the multifocal system sets the SHWP 410 to an active state, and active element 415 to its neutral state. The light in 540 is right handed circularly polarized light, the active state of the SHWP 410 reversed the polarization to left handed. As the active element 415 is neutral it does not add power to the system or affect the handedness of the light's polarization. The left handed circularly polarized light is input into the active element 420. Because the input light is left handed, the active element 420 acts in a subtractive state and removes 1.5 diopters of optical power. Note that the active element 420 also reverses the handedness of the light such that it outputs right handed circularly polarized light. The right handed circularly polarized light is input into the active element 425, and because the input light is right handed, the active element 425 acts in an additive state and adds 3.5 diopters of optical power to the negative 1.5 diopters, such that light output from the active element 425 adds a total of 2 diopters of optical power to the light input 540.

In another example, to get 0.5 diopters of optical power, the multifocal system sets the SHWP 410 to a non-active state, and active elements 420, and 425 to their neutral states. The light in 540 is right handed circularly polarized light, the non-active state of the SHWP 410 allows light to be transmitted by the SHWP 410 without changing the handedness. Accordingly, light exiting the SHWP 410 is still right handed circularly polarized light. The right handed circularly polarized light is input into the active element 415, and because the input light is right handed, the active element 415 acts in an additive state and adds 0.5 diopters of optical power. The remaining active elements 420 and 425 are in their neutral state and do not affect the optical power. Accordingly, the PBP liquid crystal lens stack 500 outputs light with an increase in 0.5 diopters of optical power. It is important to note that by selectively adjusting the optical power of the PBP liquid crystal lens stack 500, the multifocal system is able to select specific focal planes to present images to a user of a HMD. In the embodiments described above with regard to FIGS. 5A and 5B, the multifocal system is able to choose from 16 different focal planes that are separated by 0.5 diopters of optical power.

FIG. 5C is a table showing example optical power adjustments in the negative range of the stacked active PBP liquid crystal lens 500 structure shown in FIG. 5A, according to an embodiment. The table 590 illustrates how different optical powers are achieved from 0 to −3.5 diopters.

Figure 6A:
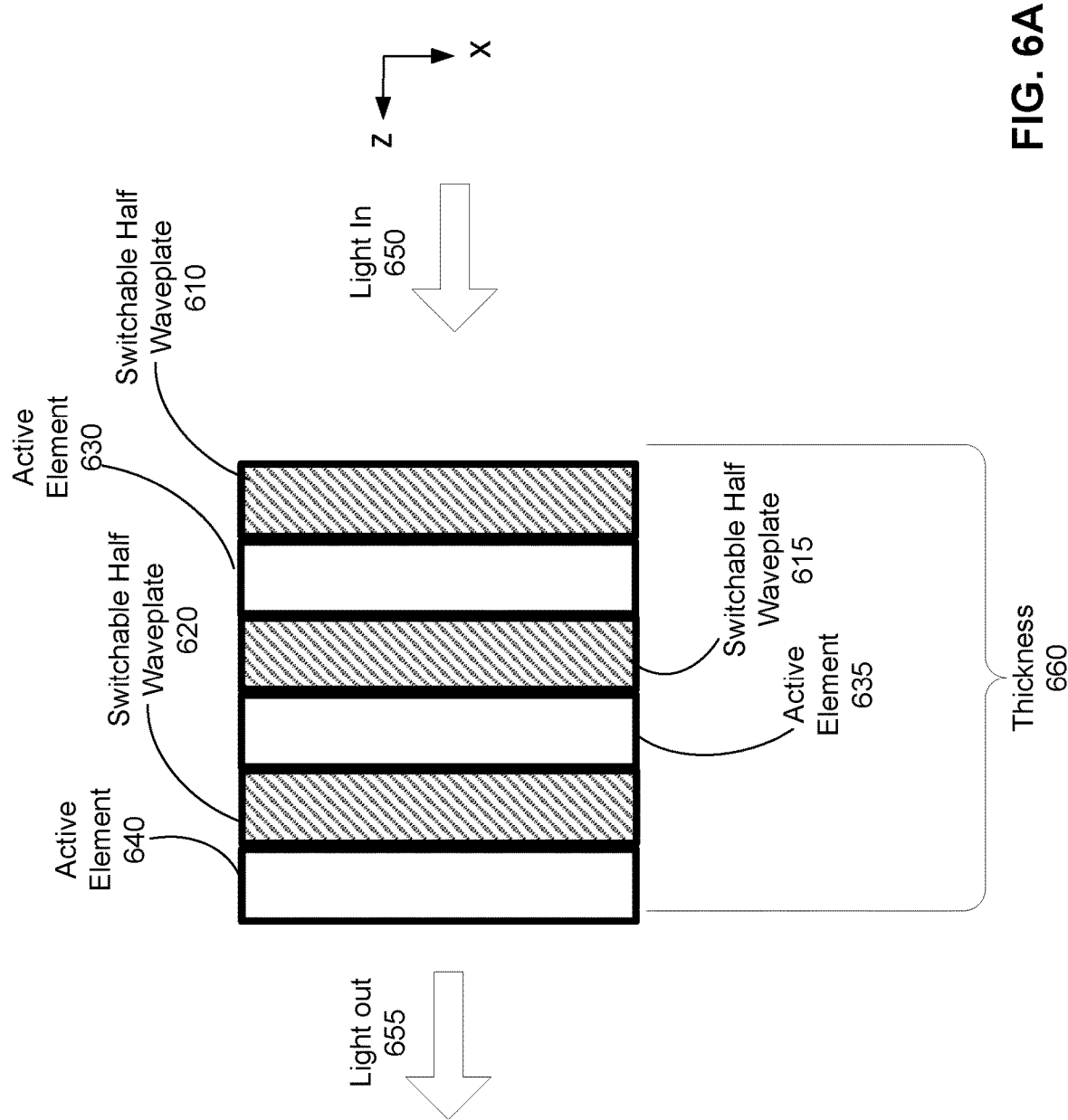
FIG. 6A is a diagram of a stacked Pancharatnam Berry Phase liquid crystal lens structure that includes a plurality of active PBP liquid crystal lens and a plurality of switchable half waveplates, according to an embodiment.

FIG. 6A is a diagram of a stacked PBP liquid crystal lens structure 600 that includes a plurality of active PBP liquid crystal lenses and a plurality of SHWPs, according to an embodiment. The stacked PBP liquid crystal lens structure 600 includes SHWPs 610, 615, and 620, and active elements 630, 635, and 640. An active element is an active PBP liquid crystal lens. In this embodiment, the stacked PBP liquid crystal lens structure 600 is composed of alternating SHWPs and active elements. This particular stacked PBP liquid crystal lens structure 600 provides multiple focus planes over a ±3.5 Diopters with a 0.5 Diopter resolution. The stacked PBP liquid crystal lens structure 600 includes 6 optical elements, and accordingly is thicker than the stacked PBP liquid crystal lens structure 500. A thickness 660 of the stacked PBP liquid crystal lens structure 600 may be, e.g., approximately 900 μm to 1800 μm.

FIG. 6B is a table 670 showing example optical power adjustments of the stacked PBP liquid crystal lens structure 600 shown in FIG. 6A, according to an embodiment. The table 670 illustrates how different optical powers are achieved. The table 670 illustrates how different optical powers are achieved from 0 to 3.5 diopters. Note one skilled in the art, using the principles described herein could easily extend this table to show how different optical powers are achieved from −3.5 diopters to 0 (e.g., show in FIG. 6C). The active lens element 630 has an additive state (+0.5 D), a subtractive state (−0.5 D), and a neutral state (0). The active lens element 635 has an additive state (+1.0 D), a subtractive state (−1.0 D), and a neutral state (0). The active lens element 640 has an additive state (+2.0 D), a subtractive state (−2.0 D), and a neutral state (0). In alternate embodiments, one or more of the active elements 630-640 may be associated with different additive/subtractive states.

A bottom row 680 of the table 670 illustrates the different amounts of optical power that that the stacked PBP liquid crystal lens structure 600 is able to provide. The multifocal system controls settings of the SHWPs 610, 615, and 620, and the active elements 630-640 to select a particular mount of optical power to add to the system. In this embodiment, there are 16 different selections that range from 0 diopters to 3.5 diopters in increments of 0.5 diopters. Note, omitted from this table (for simplicity) are 7 additional selections that range from −3.5 diopters to −0.5 diopters, these are instead shown in FIG. 6C.

FIG. 6C is a table 690 showing example optical power adjustments in the negative range of the stacked active Pancharatnam Berry Phase liquid crystal lens structure 600 shown in FIG. 6A, according to an embodiment. The table 690 illustrates how different optical powers are achieved from 0 to −3.5 diopters. For simplicity, the specific state information for each SHWP is not shown in FIG. 6C. Given the information disclosed herein, one skilled in the art would be able to determine the appropriate state values to obtain a particular amount of optical power.

Figure 7A:
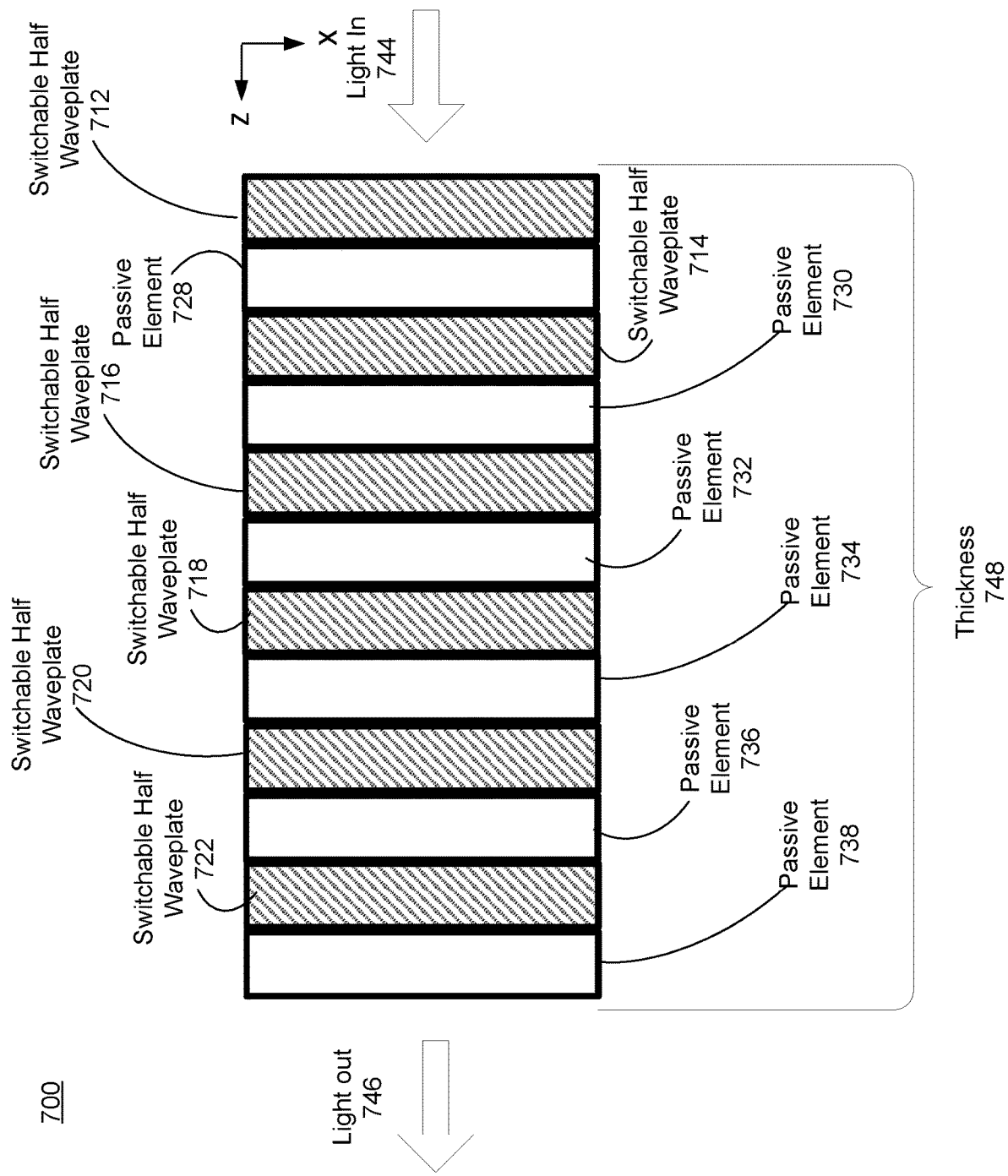
FIG. 7A is a diagram of a stacked Pancharatnam Berry Phase liquid crystal lens structure that includes a plurality of passive Pancharatnam Berry Phase liquid crystal lenses and a plurality of switchable half waveplates, according to an embodiment.

FIG. 7A is a diagram of a stacked PBP liquid crystal lens structure 700 that includes a plurality of passive PBP liquid crystal lenses and a plurality of SHWPs in optical series, according to an embodiment. The stacked PBP liquid crystal lens structure 700 includes SHWPs 712, 714, 716, 718, 720, and 722, and passive elements 728, 730, 732, 734, 736, and 738. A passive element is a passive PBP liquid crystal lens. In this embodiment, the stacked PBP liquid crystal lens structure 700 is composed of alternating SHWPs and passive elements. This particular stacked PBP liquid crystal lens structure 700 provides multiple focus planes over a ±3.5 Diopters with a 0.5 Diopter resolution. The stacked PBP liquid crystal lens structure 600 includes 12 optical elements, and accordingly is thicker than the stacked PBP liquid crystal lens structure 500, and the stacked PBP liquid crystal lens structure 600. A thickness 748 of the stacked PBP liquid crystal lens structure 700 may be, e.g., approximately 1380 μm to 2700 μm. However, the thickness could be thinner with a bigger diopter resolution per tuning step.

FIG. 7B is a table 770 showing example optical power adjustments of the stacked PBP liquid crystal lens structure 700 shown in FIG. 7A, according to an embodiment. The table 770 illustrates how different optical powers are achieved. The table 770 illustrates how different optical powers are achieved from 0 to 3.5 diopters. Note one skilled in the art, using the principles described herein could easily extend this table to show how different optical powers are achieved from −3.5 diopters to 0 (as shown in FIG. 7C). The passive lens element 728 has an additive state (+0.25 D) and a subtractive state (−0.25 D). The passive lens element 730 has an additive state (+0.25 D) and a subtractive state (−0.25 D). The passive lens element 732 has an additive state (+0.5 D) and a subtractive state (−0.5 D). The passive lens element 734 has an additive state (+0.5 D) and a subtractive state (−0.5 D). The passive lens element 736 has an additive state (+1.0 D) and a subtractive state (−1.0 D). The passive lens element 738 has an additive state (+1.0 D) and a subtractive state (−1.0 D). In alternate embodiments, one or more of the passive elements 734-738 may be associated with different additive/subtractive states.

A bottom row 780 of the table 770 illustrates the different amounts of optical power that that the stacked PBP liquid crystal lens structure 700 is able to provide. The multifocal system controls settings of the SHWPs 712, 714, 716, 718, 720, and, 722 to select a particular mount of optical power to add to the system (note as these are passive elements there is no "neutral" state). In this embodiment, there are 8 different selections that range from 0 diopters to 3.5 diopters in increments of 0.5 diopters. Note, omitted from this table (for simplicity) are 7 additional selections that range from −3.5 diopters to −0.5 diopters, these are instead included in FIG. 7C.

FIG. 7C is a table 790 showing example optical power adjustments in the negative range of the stacked passive PBP liquid crystal lens structure 700 shown in FIG. 7A, according to an embodiment. The table 790 illustrates how different optical powers are achieved from 0 to −3.5 diopters. For simplicity, the specific state information for each HWP is not shown in FIG. 7C. Given the information disclosed herein, one skilled in the art would be able to determine the appropriate state values to obtain a particular amount of optical power.

Not that while the embodiments of the PBP liquid crystal lens structures discussed above with regard to FIGS. 5A-7C, are specific embodiments. One skilled in the art may design a PBP liquid lens structure using different numbers of optical elements (e.g., active element, passive element, and/or SHWP), different amounts of optical power adjustment (e.g., ±3.75 diopters), different steps between (e.g., R=0.25 diopters), or some combination thereof, than those used in FIGS. 5A-7C.

System Overview

Figure 8:
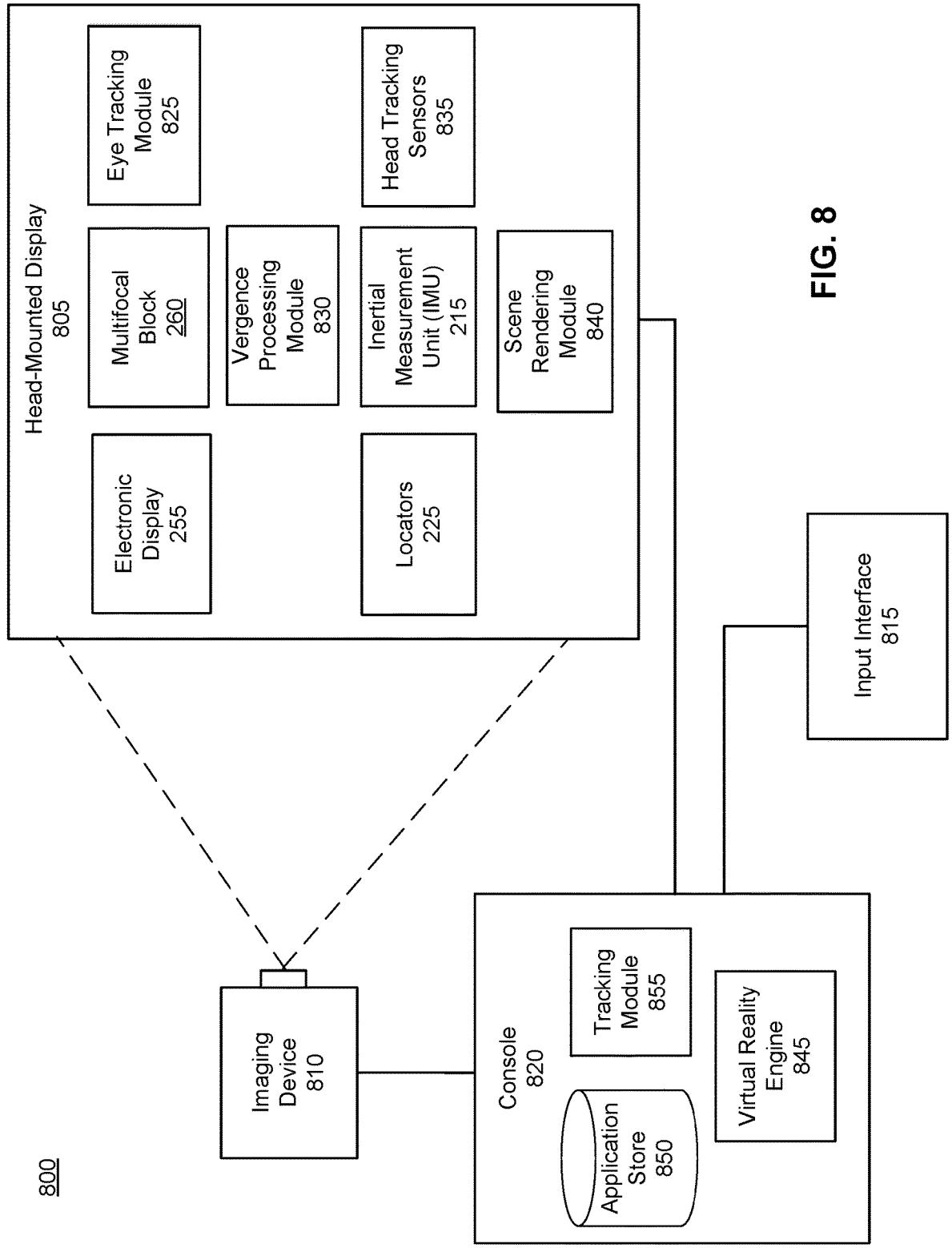
FIG. 8 is multifocal system in which a HMD operates, according to an embodiment.

FIG. 8 is multifocal system 800 in which a HMD 805 operates. The multifocal system 800 may be for use as a virtual reality (VR) system, an augmented reality (AR) system, a mixed reality (MR) system, or some combination thereof. In this example, the multifocal system 800 includes a HMD 805, an imaging device 810, and an input interface 815, which are each coupled to a console 820. While FIG. 8 shows a single HMD 805, a single imaging device 810, and a single input interface 815, in other embodiments, any number of these components may be included in the system. For example, there may be multiple HMDs 805 each having an associated input interface 815 and being monitored by one or more imaging devices 460, with each HMD 805, input interface 815, and imaging devices 460 communicating with the console 820. In alternative configurations, different and/or additional components may also be included in the multifocal system 800. The HMD 805 may act as a VR, AR, and/or a MR HMD. An MR and/or AR HMD augments views of a physical, real-world environment with computer-generated elements (e.g., images, video, sound, etc.).

The HMD 805 presents content to a user. In some embodiments, the HMD 805 is an embodiment of the HMD 200 described above with reference to FIGS. 2A and 2B. Example content includes images, video, audio, or some combination thereof. Audio content may be presented via a separate device (e.g., speakers and/or headphones) external to the HMD 805 that receives audio information from the HMD 805, the console 820, or both. The HMD 805 includes an electronic display 255 (described above with reference to FIG. 2B), a multifocal block 260 (described above with reference to FIG. 2B), an eye tracking module 825, a vergence processing module 830, one or more locators 225, an internal measurement unit (IMU) 215, head tracking sensors 835, and a scene rendering module 840.

As noted above with reference to FIG. 2B-7C, the multifocal block 260 activates and/or deactivates one or more SHWPs, one or more active PBP liquid crystal lenses, or some combination thereof to adjust a focal length (adjusts optical power) of the multifocal block 260. The multifocal block 260 adjusts its focal length responsive to instructions from the console 820.

The eye tracking module 825 tracks an eye position and eye movement of a user of the HMD 805. A camera or other optical sensor inside the HMD 805 captures image information of a user's eyes, and eye tracking module 825 uses the captured information to determine interpupillary distance, interocular distance, a three-dimensional (3D) position of each eye relative to the HMD 805 (e.g., for distortion adjustment purposes), including a magnitude of torsion and rotation (i.e., roll, pitch, and yaw) and gaze directions for each eye. In one example, infrared light is emitted within the HMD 805 and reflected from each eye. The reflected light is received or detected by the camera and analyzed to extract eye rotation from changes in the infrared light reflected by each eye. Many methods for tracking the eyes of a user can be used by eye tracking module 825. Accordingly, the eye tracking module 825 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 825 integrates information from past measurements, measurements identifying a position of a user's head, and 3D information describing a scene presented by the electronic display 255. Thus, information for the position and orientation of the user's eyes is used to determine the gaze point in a virtual scene presented by the HMD 805 where the user is looking.

The vergence processing module 830 determines a vergence depth of a user's gaze based on the gaze point or an estimated intersection of the gaze lines determined by the eye tracking module 825. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 830 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 225 are objects located in specific positions on the HMD 805 relative to one another and relative to a specific reference point on the HMD 805. A locator 225 may be a light emitting diode (LED), a corner cube reflector, a reflective marker, a type of light source that contrasts with an environment in which the HMD 805 operates, or some combination thereof. Active locators 225 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 225 can be located beneath an outer surface of the HMD 805, which is transparent to the wavelengths of light emitted or reflected by the locators 225 or is thin enough not to substantially attenuate the wavelengths of light emitted or reflected by the locators 225. Further, the outer surface or other portions of the HMD 805 can be opaque in the visible band of wavelengths of light. Thus, the locators 225 may emit light in the IR band while under an outer surface of the HMD 805 that is transparent in the IR band but opaque in the visible band.

The IMU 215 is an electronic device that generates fast calibration data based on measurement signals received from one or more of the head tracking sensors 835, which generate one or more measurement signals in response to motion of HMD 805. Examples of the head tracking sensors 835 include accelerometers, gyroscopes, magnetometers, other sensors suitable for detecting motion, correcting error associated with the IMU 215, or some combination thereof. The head tracking sensors 835 may be located external to the IMU 215, internal to the IMU 215, or some combination thereof.

Based on the measurement signals from the head tracking sensors 835, the IMU 215 generates fast calibration data indicating an estimated position of the HMD 805 relative to an initial position of the HMD 805. For example, the head tracking sensors 835 include multiple accelerometers to measure translational motion (forward/back, up/down, left/right) and multiple gyroscopes to measure rotational motion (e.g., pitch, yaw, and roll). The IMU 215 can, for example, rapidly sample the measurement signals and calculate the estimated position of the HMD 805 from the sampled data. For example, the IMU 215 integrates measurement signals received from the accelerometers over time to estimate a velocity vector and integrates the velocity vector over time to determine an estimated position of a reference point on the HMD 805. The reference point is a point that may be used to describe the position of the HMD 805. While the reference point may generally be defined as a point in space, in various embodiments, a reference point is defined as a point within the HMD 805 (e.g., a center of the IMU 730). Alternatively, the IMU 215 provides the sampled measurement signals to the console 820, which determines the fast calibration data.

The IMU 215 can additionally receive one or more calibration parameters from the console 820. As further discussed below, the one or more calibration parameters are used to maintain tracking of the HMD 805. Based on a received calibration parameter, the IMU 215 may adjust one or more of the IMU parameters (e.g., sample rate). In some embodiments, certain calibration parameters cause the IMU 215 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 840 receives content for the virtual scene from a VR engine 845 and provides the content for display on the electronic display 255. Additionally, the scene rendering module 840 can adjust the content based on information from the vergence processing module 830, the IMU 215, and the head tracking sensors 835. The scene rendering module 840 determines a portion of the content to be displayed on the electronic display 255 based on one or more of the tracking module 855, the head tracking sensors 835, or the IMU 215, as described further below.

The imaging device 810 generates slow calibration data in accordance with calibration parameters received from the console 820. Slow calibration data includes one or more images showing observed positions of the locators 225 that are detectable by imaging device 810. The imaging device 810 may include one or more cameras, one or more video cameras, other devices capable of capturing images including one or more locators 225, or some combination thereof. Additionally, the imaging device 810 may include one or more filters (e.g., for increasing signal to noise ratio). The imaging device 810 is configured to detect light emitted or reflected from the locators 225 in a field of view of the imaging device 810. In embodiments where the locators 225 include passive elements (e.g., a retroreflector), the imaging device 810 may include a light source that illuminates some or all of the locators 225, which retro-reflect the light towards the light source in the imaging device 810. Slow calibration data is communicated from the imaging device 810 to the console 820, and the imaging device 810 receives one or more calibration parameters from the console 820 to adjust one or more imaging parameters (e.g., focal length, focus, frame rate, ISO, sensor temperature, shutter speed, aperture, etc.).

The input interface 815 is a device that allows a user to send action requests to the console 820. An action request is a request to perform a particular action. For example, an action request may be to start or end an application or to perform a particular action within the application. The input interface 815 may include one or more input devices. Example input devices include a keyboard, a mouse, a game controller, or any other suitable device for receiving action requests and communicating the received action requests to the console 820. An action request received by the input interface 815 is communicated to the console 820, which performs an action corresponding to the action request. In some embodiments, the input interface 815 may provide haptic feedback to the user in accordance with instructions received from the console 820. For example, haptic feedback is provided by the input interface 815 when an action request is received, or the console 820 communicates instructions to the input interface 815 causing the input interface 815 to generate haptic feedback when the console 820 performs an action.

The console 820 provides content to the HMD 805 for presentation to the user in accordance with information received from the imaging device 810, the HMD 805, or the input interface 815. In the example shown in FIG. 8, the console 820 includes an application store 850, a tracking module 855, and the VR engine 845. Some embodiments of the console 820 have different or additional modules than those described in conjunction with FIG. 8. Similarly, the functions further described below may be distributed among components of the console 820 in a different manner than is described here.

The application store 850 stores one or more applications for execution by the console 820. An application is a group of instructions, that when executed by a processor, generates content for presentation to the user. Content generated by an application may be in response to inputs received from the user via movement of the HMD 805 or the input interface 815. Examples of applications include gaming applications, conferencing applications, video playback application, or other suitable applications.

The tracking module 855 calibrates the multifocal system 800 using one or more calibration parameters and may adjust one or more calibration parameters to reduce error in determining position of the HMD 805. For example, the tracking module 855 adjusts the focus of the imaging device 810 to obtain a more accurate position for observed locators 225 on the HMD 805. Moreover, calibration performed by the tracking module 855 also accounts for information received from the IMU 215. Additionally, if tracking of the HMD 805 is lost (e.g., imaging device 810 loses line of sight of at least a threshold number of locators 225), the tracking module 855 re-calibrates some or all of the multifocal system 800 components.

Additionally, the tracking module 855 tracks the movement of the HMD 805 using slow calibration information from the imaging device 810 and determines positions of a reference point on the HMD 805 using observed locators from the slow calibration information and a model of the HMD 805. The tracking module 855 also determines positions of the reference point on the HMD 805 using position information from the fast calibration information from the IMU 215 on the HMD 805. Additionally, the tracking module 855 may use portions of the fast calibration information, the slow calibration information, or some combination thereof, to predict a future location of the HMD 805, which is provided to the VR engine 845.

The VR engine 845 executes applications within the multifocal system 800 and receives position information, acceleration information, velocity information, predicted future positions, or some combination thereof for the HMD 805 from the tracking module 855. Based on the received information, the VR engine 845 determines content to provide to the HMD 805 for presentation to the user, such as a virtual scene, one or more virtual objects to overlay onto a real world scene, etc.

In some embodiments, the VR engine 845 maintains focal capability information of the multifocal block 260. Focal capability information is information that describes what focal distances are available to the multifocal block 260. Focal capability information may include, e.g., a range of focus the multifocal block 260 is able to accommodate (e.g., 0 to 4 diopters), a resolution of focus (e.g., 0.25 diopters), a number of focal planes, combinations of settings for SHWPs (e.g., active or non-active) that map to particular focal planes, combinations of settings for SHWPS and active PBP liquid crystal lenses that map to particular focal planes, or some combination thereof.

The VR engine 845 generates instructions for the multifocal block 260, the instructions causing the multifocal block 260 to adjust its focal distance to a particular location. The VR engine 845 generates the instructions based on focal capability information and, e.g. information from the vergence processing module 830, the IMU 215, and the head tracking sensors 835. The VR engine 845 uses the information from the vergence processing module 830, the IMU 215, and the head tracking sensors 835, or some combination thereof, to select an ideal focal plane to present content to the user. The VR engine 845 then uses the focal capability information to select a focal plane that is closest to the ideal focal plane. The VR engine 845 uses the focal information to determine settings for one or SHWPs, one or more active PBP liquid crystal lenses, or some combination thereof, within the multifocal block 260 that are associated with the selected focal plane. The VR engine 845 generates instructions based on the determined settings, and provides the instructions to the multifocal block 260.

Additionally, the VR engine 845 performs an action within an application executing on the console 820 in response to an action request received from the input interface 815 and provides feedback to the user that the action was performed. The provided feedback may be visual or audible feedback via the HMD 805 or haptic feedback via VR input interface 815.

Figure 9:
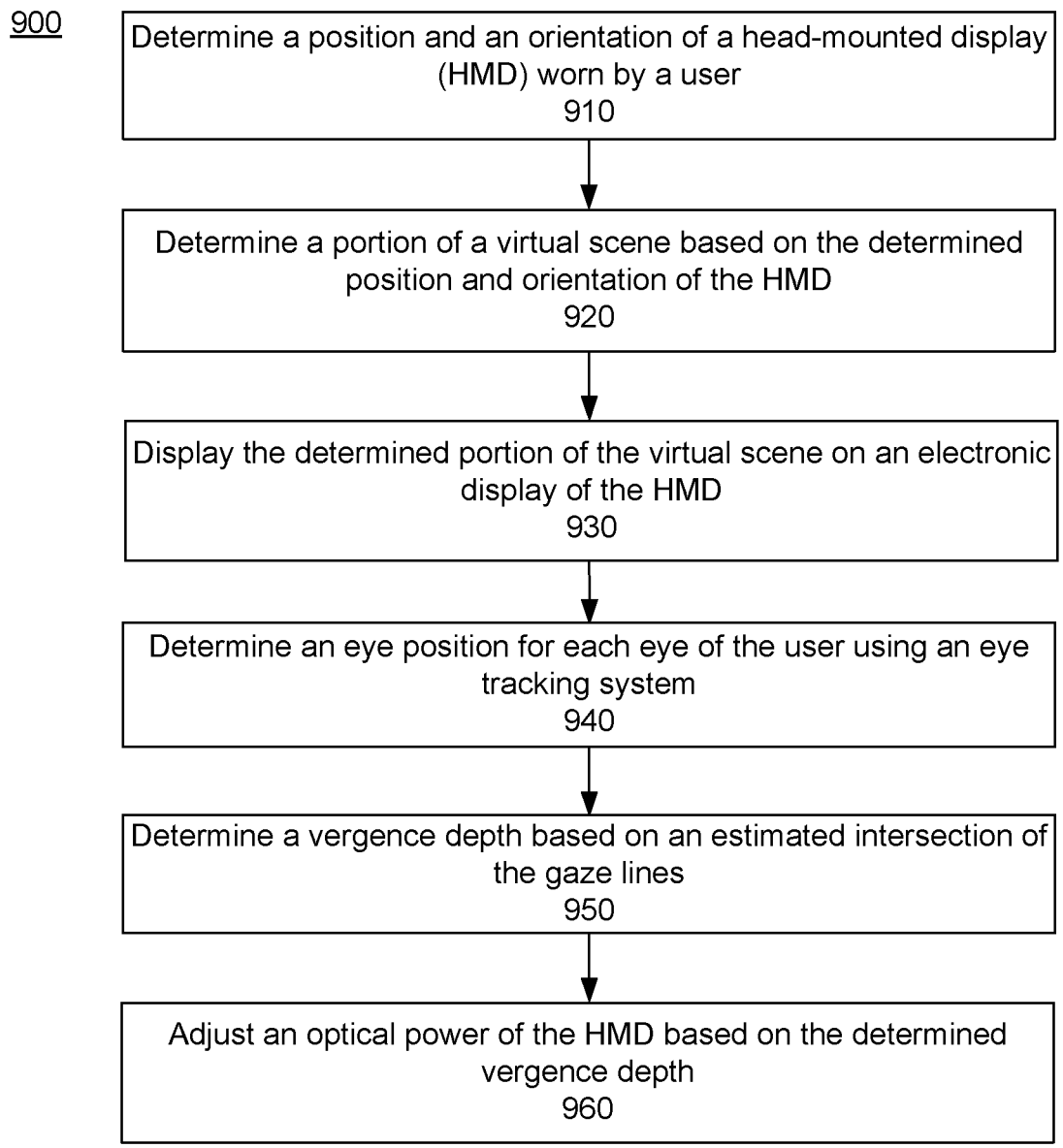
FIG. 9 is a process for mitigating vergence-accommodation conflict by adjusting the focal length of a HMD, according to an embodiment.

FIG. 9 is a process 900 for mitigating vergence-accommodation conflict by adjusting the focal length of an HMD 805, according to an embodiment. The process 900 may be performed by the multifocal system 800 in some embodiments. Alternatively, other components may perform some or all of the steps of the process 900. For example, in some embodiments, a HMD 805 and/or a console (e.g., console 820) may perform some of the steps of the process 900. Additionally, the process 900 may include different or additional steps than those described in conjunction with FIG. 9 in some embodiments or perform steps in different orders than the order described in conjunction with FIG. 9.

As discussed above, a multifocal system 900 may dynamically vary its focus to bring images presented to a user wearing the HMD 200 into focus, which keeps the user's eyes in a zone of comfort as vergence and accommodation change. Additionally, eye tracking in combination with the variable focus of the multifocal system allows blurring to be introduced as depth cues in images presented by the HMD 200.

The multifocal system 900 determines 810 a position, an orientation, and/or a movement of HMD 805. The position is determined by a combination of the locators 225, the IMU 215, the head tracking sensors 835, the imagining device 810, and the tracking module 855, as described above in conjunction with FIG. 8.

The multifocal system 800 determines 920 a portion of a virtual scene based on the determined position and orientation of the HMD 805. The multifocal system maps a virtual scene presented by the HMD 805 to various positions and orientations of the HMD 805. Thus, a portion of the virtual scene currently viewed by the user is determined based on the position, orientation, and movement of the HMD 805.

The multifocal system 800 displays 930 the determined portion of the virtual scene being on an electronic display (e.g., the electronic display 255) of the HMD 805. In some embodiments, the portion is displayed with a distortion correction to correct for optical error that may be caused by the image light passing through the multifocal block 260. Further, the multifocal block 260 has activated/deactivated one or more SHWPS, active PBP liquid crystal lenses, or some combination thereof, to provide focus and accommodation to the location in the portion of the virtual scene where the user's eyes are verged.

The multifocal system 800 determines 940 an eye position for each eye of the user using an eye tracking system. The multifocal system 800 determines a location or an object within the determined portion at which the user is looking to adjust focus for that location or object accordingly. To determine the location or object within the determined portion of the virtual scene at which the user is looking, the HMD 805 tracks the position and location of the user's eyes using image information from an eye tracking system (e.g., eye tracking module 825). For example, the HMD 805 tracks at least a subset of a 3D position, roll, pitch, and yaw of each eye and uses these quantities to estimate a 3D gaze point of each eye.

Figure 10:
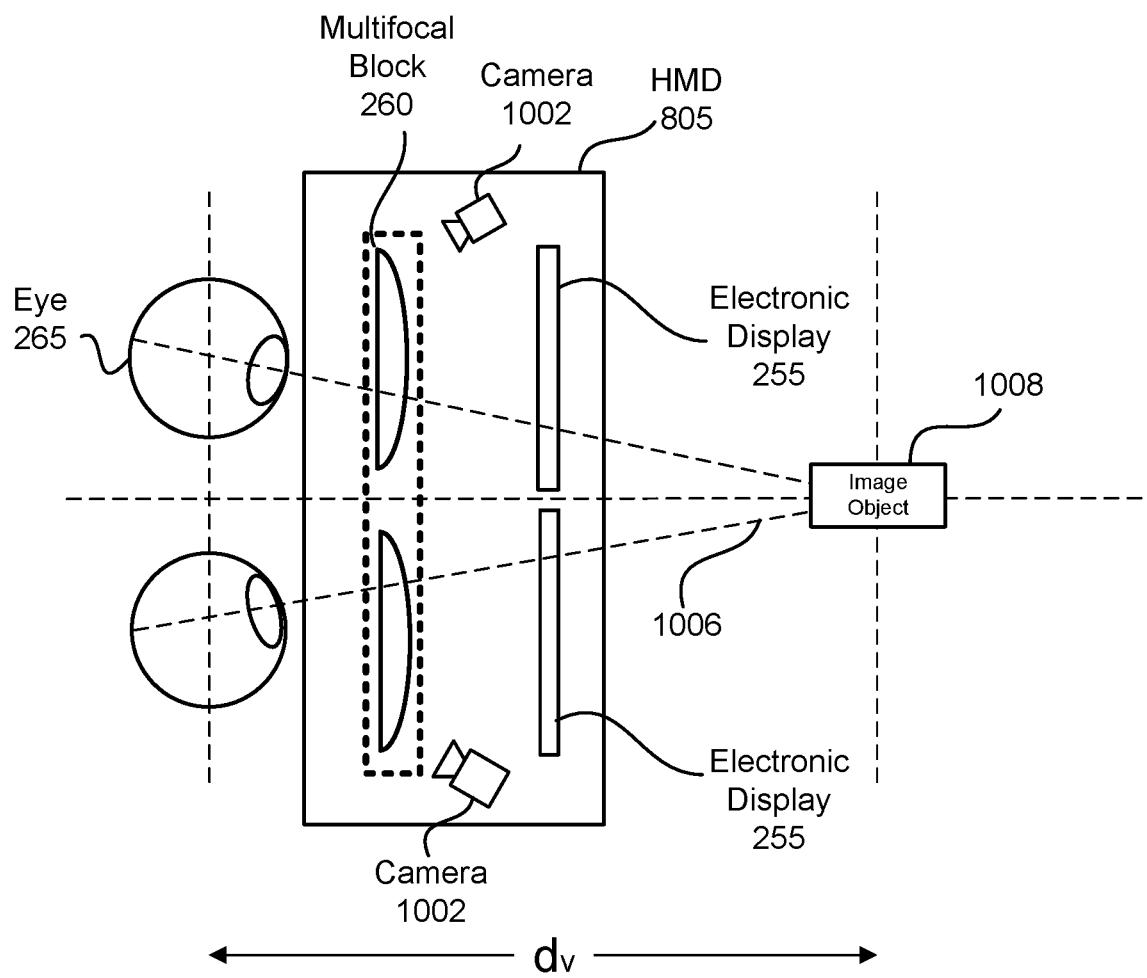
FIG. 10 shows an example process for mitigating vergence-accommodation conflict by adjusting a focal length of a multifocal block that includes two stacked LC structures, in accordance with an embodiment.

The multifocal system 800 determines 950 a vergence depth based on an estimated intersection of gaze lines. For example, FIG. 10 shows a cross section of an embodiment of the HMD 805 that includes camera 1002 for tracking a position of each eye 265, the electronic display 255, and the multifocal block 260 that includes stacked PBP liquid crystal structures, as described with respect to, e.g., FIGS. 2B-7C. In this example, the camera 1002 captures images of the user's eyes looking at an image object 1008 and the eye tracking module 825 determines an output for each eye 265 and gaze lines 1006 corresponding to the gaze point or location where the user is looking based on the captured images. Accordingly, vergence depth ($d_v$) of the image object 1008 (also the user's gaze point) is determined 950 based on an estimated intersection of the gaze lines 1006. As shown in FIG. 910, the gaze lines 1006 converge or intersect at distance where the image object 1008 is located. In some embodiments, information from past eye positions, information describing a position of the user's head, and information describing a scene presented to the user may also be used to estimate the 3D gaze point of an eye in various embodiments.

Accordingly, referring again to FIG. 9, the multifocal system 800 adjusts 960 an optical power of the HMD 805 based on the determined vergence depth. The multifocal system 800 selects a focal plane closest to the determined vergence depth by controlling one or more SHWPs, one or more active PBP liquid crystal lenses, or some combination thereof. As described above, the optical power of the multifocal block 260 is adjusted to change a focal distance of the HMD 805 to provide accommodation for the determined vergence depth corresponding to where or what in the displayed portion of the virtual scene the user is looking.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
selecting a focal plane, from a plurality of focal planes of a multifocal block, and each of the plurality of focal planes is determined in part by respective settings of at least one switchable half waveplate (SHWP) that is in optical series with a plurality of liquid crystal (LC) lenses within the multifocal block; and
adjusting the settings of the at least one SHWP, thereby changing an optical power of the multifocal block such that a focal plane of the multifocal block is adjusted to the selected focal plane.

2. The method of claim 1, wherein each LC lens of the plurality of LC lenses has a plurality of optical states, the plurality of optical states including an additive state that adds optical power to the LC lens and a subtractive state that removes optical power from the LC lens.

3. The method of claim 2, wherein each LC lens of the plurality of LC lenses also has a neutral state that does not affect optical power, and a range of adjustment of optical power for the multifocal block is a set of discrete values of optical power.

4. The method of claim 1, wherein the at least one SHWP is one of a plurality of SHWPs that is in optical series with the plurality of LC lenses, and each LC lens of the plurality of LC lenses is directly adjacent to at least one SHWP of the plurality of SHWPs.

5. The method of claim 1, wherein a range of adjustment of optical power for the multifocal block is a set of discrete values of optical power, and a size of the range of adjustment scales with a number of LC lenses that makes up the plurality of LC lenses.

6. The method of claim 1, wherein the plurality of LC lenses comprises at least two LC lenses, wherein a first additive state of a first LC lens differs in optical power addition from a second additive state of a second LC lens and a first subtractive state of the first LC lens differs in optical power subtraction from a second subtractive state of the second LC lens.

7. The method of claim 1, wherein each LC lens of the plurality of LC lenses is a Pancharatnam Berry Phase (PBP) liquid crystal lens.

8. A non-transitory computer readable medium configured to store program code instructions, when executed by a processor, cause the processor to perform steps comprising:
selecting a focal plane, from a plurality of focal planes of a multifocal block, and each of the plurality of focal planes is determined in part by respective settings of at least one switchable half waveplate (SHWP) that is in optical series with a plurality of liquid crystal (LC) lenses within the multifocal block; and
adjusting the settings of the at least one SHWP, thereby changing an optical power of the multifocal block such that a focal plane of the multifocal block is adjusted to the selected focal plane.

9. The computer readable medium of claim 8, wherein each LC lens of the plurality of LC lenses has a plurality of optical states, the plurality of optical states including an additive state that adds optical power to the LC lens and a subtractive state that removes optical power from the LC lens.

10. The computer readable medium of claim 9, wherein each LC lens of the plurality of LC lenses also has a neutral state that does not affect optical power, and a range of adjustment of optical power for the multifocal block is a set of discrete values of optical power.

11. The computer readable medium of claim 8, wherein the at least one SHWP is one of a plurality of SHWPs that is in optical series with the plurality of LC lenses, and each LC lens of the plurality of LC lenses is directly adjacent to at least one SHWP of the plurality of SHWPs.

12. The computer readable medium of claim 8, wherein a range of adjustment of optical power for the multifocal block is a set of discrete values of optical power, and a size of the range of adjustment scales with a number of LC lenses that makes up the plurality of LC lenses.

13. The computer readable medium of claim 8, wherein the plurality of LC lenses comprises at least two LC lenses, wherein a first additive state of a first LC lens differs in optical power addition from a second additive state of a second LC lens and a first subtractive state of the first LC lens differs in optical power subtraction from a second subtractive state of the second LC lens.

14. A head-mounted display (HMD) comprising:
a multifocal block that has a plurality of focal planes comprising:
a plurality of liquid crystal (LC) lenses; and
at least one switchable half waveplate (SHWP) that is in optical series with the plurality of LC lenses, wherein, and each of the plurality of focal planes is determined in part by respective settings of the at least one SHWP,
wherein the HMD is configured to select a focal plane, from the plurality of focal planes, and
the multifocal block is configured to adjust the setting of the at least one SHWP, thereby changing an optical power of the multifocal block such that a focal plane of the multifocal block is adjusted to the selected focal plane.

15. The HMD of claim 14, wherein each LC lens of the plurality of LC lenses has a plurality of optical states, the plurality of optical states including an additive state that adds optical power to the LC lens and a subtractive state that removes optical power from the LC lens.

16. The HMD of claim 15, wherein each LC lens of the plurality of LC lenses also has a neutral state that does not affect optical power.

17. The HMD of claim 14, wherein the at least one SHWP is one of a plurality of SHWPs that is in optical series with the plurality of LC lenses, and each LC lens of the plurality of LC lenses is directly adjacent to at least one SHWP of the plurality of SHWPs.

18. The HMD of claim 14, wherein a range of adjustment of optical power for the multifocal block is a set of discrete values of optical power.

19. The HMD of claim 18, wherein a size of the range of adjustment scales with a number of LC lenses that makes up the plurality of LC lenses.

20. The HMD of claim 14, wherein the plurality of LC lenses comprises at least two LC lenses, wherein a first additive state of a first LC lens differs in optical power addition from a second additive state of a second LC lens and a first subtractive state of the first LC lens differs in optical power subtraction from a second subtractive state of the second LC lens.

* * * * *